(12) United States Patent
Suzuki et al.

(10) Patent No.: US 9,340,661 B2
(45) Date of Patent: May 17, 2016

(54) COATED MAGNESIUM OXIDE PARTICLES, METHOD FOR THE PRODUCTION THEREOF, HEAT-RELEASING FILLER, AND RESIN COMPOSITION

(71) Applicant: Sakai Chemical Industry Co., Ltd., Sakai-shi, Osaka (JP)

(72) Inventors: Masahiro Suzuki, Sakai (JP); Ken-Ichi Nakagawa, Sakai (JP)

(73) Assignee: Sakai Chemical Industry Co., Ltd., Osaka (JP)

( * ) Notice: Subject to any disclaimer, the term of this patent is extended or adjusted under 35 U.S.C. 154(b) by 3 days.

(21) Appl. No.: 14/177,903

(22) Filed: Feb. 11, 2014

(65) Prior Publication Data

US 2014/0235753 A1    Aug. 21, 2014

Related U.S. Application Data

(63) Continuation-in-part of application No. PCT/JP2012/070047, filed on Aug. 7, 2012.

(30) Foreign Application Priority Data

Aug. 12, 2011 (JP) ................................. 2011-176645
Jan. 19, 2012 (JP) ................................. 2012-008793

(51) Int. Cl.
| | | |
|---|---|---|
| *C09C 3/10* | (2006.01) | |
| *C08K 9/10* | (2006.01) | |
| *C01F 5/02* | (2006.01) | |
| *C08L 63/00* | (2006.01) | |
| *C08K 9/08* | (2006.01) | |
| *C08K 3/22* | (2006.01) | |
| *C09C 1/02* | (2006.01) | |

(52) U.S. Cl.
CPC ... *C08K 9/10* (2013.01); *C01F 5/02* (2013.01); *C08K 9/08* (2013.01); *C08L 63/00* (2013.01); *C01P 2004/51* (2013.01); *C01P 2004/61* (2013.01); *C01P 2006/12* (2013.01); *C08K 2003/222* (2013.01); *C08K 2201/003* (2013.01); *C09C 1/028* (2013.01); *C09C 3/10* (2013.01)

(58) Field of Classification Search
CPC ............ C09C 3/10; C09C 1/028; C08K 9/08; C08K 9/10; C08K 2003/222
USPC .......................... 523/205; 428/407; 427/221
See application file for complete search history.

(56) References Cited

U.S. PATENT DOCUMENTS

| | | | | |
|---|---|---|---|---|
| 4,155,883 | A | * | 5/1979 | Oguchi et al. ............. 430/109.2 |
| 6,265,126 | B1 | * | 7/2001 | Nishihara et al. ........ 430/108.21 |
| 2001/0026863 | A1 | | 10/2001 | Hirano et al. |
| 2010/0311936 | A1 | | 12/2010 | Smith et al. |

FOREIGN PATENT DOCUMENTS

| | | | |
|---|---|---|---|
| JP | 60-188419 | A | 9/1985 |
| JP | 2011-007638 | A | 1/2001 |
| JP | 2006022130 | A * | 1/2006 |
| JP | 2009-007215 | A | 1/2009 |
| JP | 04-011624 | | 1/2014 |
| WO | WO-2010/096345 | A1 | 8/2010 |
| WO | WO 2010096345 | A1 * | 8/2010 |

OTHER PUBLICATIONS

Full English language translation of JP 04-011624, Jan. 16, 1992.*

* cited by examiner

*Primary Examiner* — Vickey Nerangis
(74) *Attorney, Agent, or Firm* — Polsinelli PC

(57) ABSTRACT

The object of the present disclosure is to obtain coated magnesium oxide particles suitably usable as a heat-releasing material in the electric/electronic field by improving acid resistance and water resistance. Coated magnesium oxide particles having a surface coating formed by curing an epoxy resin are provided.

20 Claims, 3 Drawing Sheets
(1 of 3 Drawing Sheet(s) Filed in Color)

COATED MAGNESIUM OXIDE PARTICLES, METHOD FOR THE PRODUCTION THEREOF, HEAT-RELEASING FILLER, AND RESIN COMPOSITION

CROSS REFERENCE TO RELATED APPLICATIONS

This application is a continuation-in-part of International Application No. PCT/JP2012/070047 filed on Aug. 7, 2012; and this application claims priority to Application No. 2012-008793 filed in Japan on Jan. 19, 2012, and this application claims priority to Application No. 2011-176645 filed in Japan on Aug. 12, 2011; the entire contents of all are hereby incorporated by reference.

TECHNICAL FIELD

The present invention relates to coated magnesium oxide particles, a method for the producing thereof, a heat-releasing filler, and a resin composition.

BACKGROUND OF THE DISCLOSURE

Magnesium oxide is a compound excellent in heat resistance, thermal conductivity, and electric insulation and is widely used in various industrial fields such as a vulcanization accelerator for rubber, pigment for paint and ink, and drugs. Heat-releasing filler has been proposed as one of the various applications of such magnesium oxide (Patent Documents 1, 2, etc.).

Alumina, aluminum nitride, etc. are commonly used today as such a heat-releasing filler. However, there is a problem that a kneading machine is worn very much in the course of the production of a heat-releasing sheet, etc. because of the high Mohs hardness of alumina. In addition, aluminum nitride has a drawback that its filling into resin in a high content is difficult to attain because of its poor filling property. Moreover, aluminum nitride also has a drawback that it raises the price of heat-releasing members because of its high expense. Therefore, there is a demand for new heat-releasing fillers different from these raw materials.

On the other hand, magnesium oxide particles have an advantage of excelling in handleability because the particles are made of a compound low in Mohs hardness and low in specific gravity. Moreover, because of being a material with a high electric resistance value, magnesium oxide particles are suitable also for use in the electrical and electric fields. However, magnesium oxide has a drawback of being poor in water resistance and acid resistance. For this reason, there is a problem that under usage conditions such that magnesium oxide comes into contact with water, it is transformed into magnesium hydroxide, so that durability against water cannot be obtained. Moreover, there is another problem that expansion occurs upon conversion into magnesium hydroxide due to water absorption.

On the other hand, Patent Documents 3 and 4 are known as a method of coating the surface of an inorganic powder with an epoxy resin. The coating with an epoxy resin disclosed in these documents, however, is coating formed by dispersing it in an aqueous medium. For this reason, there is a problem that if such treatment is applied to magnesium oxide, the magnesium oxide is degenerated due to hydration and transformed into magnesium hydroxide. Therefore, magnesium oxide coated with an epoxy resin cannot be obtained by such a method.

PRIOR TECHNICAL DOCUMENT

Patent Document

[Patent Document 1] Japanese Kokai Publication 2009-007215
[Patent Document 2] International Publication 2011/007638
[Patent Document 3] Japanese Kokai Publication Sho60-188419
[Patent Document 4] Japanese Kokai Publication Hei04-011624

SUMMARY OF INVENTION

Problem to be Solved by the Invention

The present invention intends to obtain coated magnesium oxide particles suitably usable as a heat-releasing material in the electric/electronic field by improving acid resistance and water resistance.

Means for Solving Object

The present invention is directed to coated magnesium oxide particles having a surface coating formed by curing an epoxy resin.

It is preferred that the coated magnesium oxide particles have a (median diameter)/(specific surface area diameter determined from specific surface area) ratio of 2 or less and a Dmax/(specific surface area diameter determined from specific surface area) ratio of 4 or less.

Preferably, the surface coating is one that has been formed by spray drying a slurry comprising magnesium oxide particles, an epoxy resin, and an epoxy resin curing agent.

Preferably, the slurry further comprises an ammonium salt of polycarboxylic acid.

It is preferred that the dispersion medium of the slurry is composed of 90% by weight or less of water and a water-miscible solvent as the remainder.

It is preferred for the coated magnesium oxide particles that the coating amount of the epoxy resin is not less than 0.01 part by weight and not more than 50 parts by weight per 100 parts by weight of magnesium oxide.

Preferably, the coated magnesium oxide particles are ones obtained by further applying surface treatment.

The present invention is also directed to a method for producing the coated magnesium oxide particles, comprising: step (1) of preparing a slurry comprising magnesium oxide particles, an epoxy resin, and an epoxy resin curing agent, and step (2) of spray drying the slurry obtained by the step (1).

Preferably, above-mentioned slurry further comprises an ammonium salt of polycarboxylic acid.

It is preferred that the dispersion medium of the slurry is composed of 90% by weight or less of water and a water-miscible solvent as the remainder.

In the above-mentioned production method, it is preferred that the magnesium oxide particles have a (median diameter)/(specific surface area diameter determined from specific surface area) ratio of 2 or less and a Dmax/(specific surface area diameter determined from specific surface area) ratio of 4 or less.

The present invention is also directed to a heat-releasing filler composed of the coated magnesium oxide particles.

The present invention is also directed to a resin composition comprising the coated magnesium oxide particles.

Effect of the Invention

The coated magnesium oxide particles of the present invention have been remarkably improved in acid resistance and water resistance. Since the coated magnesium oxide particles have such characteristics, they can be used suitably as a heat-releasing filler in the electric/electronic field. In addition, such coated magnesium oxide particles are better in handleability as compared with heat-releasing fillers heretofore used, such as alumina and aluminum nitride, and have excellent characteristics.

BRIEF DESCRIPTION OF THE DRAWINGS

The file of this patent application contains at least one drawing executed in color. Copies of this patent with color drawing(s) will be provided by the Patent and Trademark Office upon request and payment of the necessary fee.

DETAILED DESCRIPTION OF PREFERRED EMBODIMENTS

Figure 1:
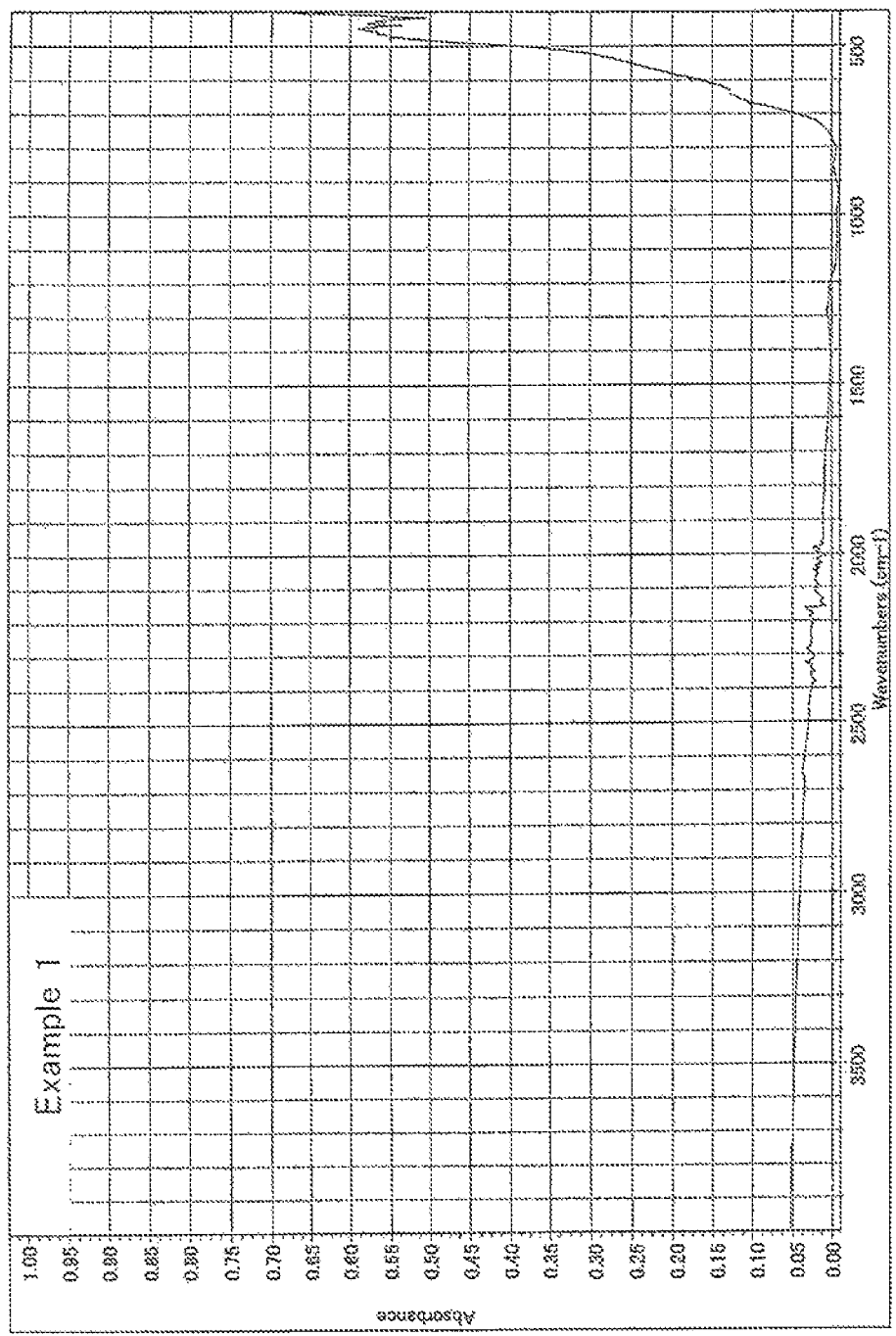
FIG. 1 is a diagram showing an IR chart of the coated magnesium oxide particles of Example 1 of the present invention.

The present invention is directed to coated magnesium oxide particles having a surface coating film formed by curing an epoxy resin. It is important here that the inorganic particles that serve as cores are magnesium oxide. Magnesium oxide has a nature of being easy to change into magnesium hydroxide upon contact with water. Therefore, even if surface coating is applied by a known method utilizing a prolonged reaction in an aqueous system as disclosed in Patent Documents 3, and 4 using magnesium oxide as a raw material, there are afforded particles of magnesium hydroxide or of a mixture of magnesium hydroxide and magnesium oxide.

In the present invention, particles that serve as cores are configured to be made of magnesium oxide and a strong coating of an epoxy resin is formed on the particles. This makes it possible to obtain coated magnesium oxide particles that excel in acid resistance and water resistance and can be used suitably as a heat-releasing filler, etc.

The fact that the core particles are not magnesium hydroxide but magnesium oxide in the coated magnesium oxide particles of the present invention can be confirmed by an arbitrary known analysis method such as checking the presence of absorption at near 3700 $cm^{-1}$ by infrared spectroscopy (the IR method).

The coated magnesium oxide particles of the present invention have a resin coating obtained by curing an epoxy resin. The resin coating obtained by curing an epoxy resin can improve acid resistance and water resistance remarkably because the resin coating adheres firmly to the surface of magnesium oxide particles and is highly chemically stable. For this reason, the coated magnesium oxide particles of the present invention can maintain high acid resistance and high water resistance even in, for example, the case of use in addition to resin for the purpose of a heat-releasing filler or the like. Accordingly, the coated magnesium oxide particles have, for example, an advantage that they can be used even under high temperature and high humidity and/or in an acidic gas atmosphere.

The resin coating obtained by curing the epoxy resin in the present invention is not particularly restricted, and examples thereof include a resin coating obtained by mixing the epoxy resin with a curing agent as well as a curing aid, etc. to be used as required, and then reacting them. The epoxy resin that can be used here is not particularly restricted and examples thereof include bisphenol A type epoxy resins, bisphenol F type epoxy resins, novolac type epoxy resins, and hydrogenated bisphenol A type epoxy resins as well as aliphatic epoxy resins, such as ethylene glycol diglycidyl ether, diethylene glycol diglycidyl ether, polyethylene glycol diglycidyl ether, propylene glycol diglycidyl ether, polypropylene glycol diglycidyl ether, neopentyl glycol diglycidyl ether, 1,6-hexanediol diglycidyl ether, trimethylolpropane polyglycidyl ether, diglycidyl hexahydrophthalate, glycerol polyglycidyl ether, diglycerol polyglycidyl ether, and polyglycerol polyglycidyl ether. These can be used singly or two or more of them can be used in combination.

Commercially available products of the above-mentioned epoxy resin include bisphenol A type epoxy resins, such as "jER 827", "jER 828", "jER 828EL", "jER 828XA", "jER 834" (produced by Mitsubishi Chemical Corporation), "EPICLON 840", "EPICLON 840-S", "EPICLON 850", "EPICLON 850-S", "EPICLON 850-CRP", "EPICLON 850-LC" (produced by DIC), "EPOTOTE YD-127", "EPOTOTE YD-128" (produced by Tohto Kasei Co., Ltd.), "RIKARESIN BPO-20E" and "RIKARESIN BEO-60E" (produced by New Japan Chemical Co., Ltd.), bisphenol F type epoxy resins, such as "jER 806", "jER 807" (produced by Mitsubishi Chemical Corporation), "EPICLON 830", "EPICLON 830-S", "EPICLON 835" (produced by DIC), and "EPOTOTE YDF-170" (produced by Tohto Kasei Co., Ltd.); novolac type epoxy resins, such as "jER 152" (produced by Mitsubishi Chemical Corporation), and hydrogenated bisphenol A type epoxy resins, such as "jER YX8000", "jER YX8034" (produced by Mitsubishi Chemical Corporation), "EPOTOTE ST-3000" (produced by Tohto Kasei Co., Ltd.), "RIKARESIN HBE-100" (produced by New Japan Chemical Co., Ltd.), "Denacol EX-252" (produced by Nagase ChemteX Corporation), and "SR-HBA" (produced by Sakamoto Yakuhin Kogyo Co., Ltd.), as well as aliphatic epoxy resins, such as "YED205", "YED216M", "YED216D" (produced by Mitsubishi Chemical Corporation), "EPOTOTE YH-300", "EPOTOTE YH-301", "EPOTOTE YH-315", "EPOTOTE YH-324", "EPOTOTE YH-325" (produced by Tohto Kasei Co., Ltd.) "DENACOL EX-211", "DENACOL EX-212", "DENACOL EX-212L", "DENACOL EX-214L", "DENACOL EX-216L", "DENACOL EX-313", "DENACOL EX-314", "DENACOL EX-321", "DENACOL EX-321L", "DENACOL EX-411", "DENACOL EX-421", "DENACOL EX-512", "DENACOL EX-521", "DENACOL EX-611", "DENACOL EX-612", "DENACOL EX-614", "DENACOL EX-614B", "DENACOL EX-622", "DENACOL EX-810", "DENACOL EX-811", "DENACOL EX-850", "DENACOL EX-850L", "DENACOL EX-851", "DENACOL EX-821", "DENACOL EX-830", "DENACOL EX-832", "DENACOL EX-841", "DENACOL EX-861", "DENACOL EX-911", "DENACOL EX-941", "DENACOL EX-920", "DENACOL EX-931" (produced by Nagase ChemteX Corporation), "SR-NPG", "SR-16H", "SR-16HL", "SR-TMP", "SR-PG", "SR-TPG", "SR-4PG", "SR-2EG", "SR-8EG", "SR-8EGS", "SR-GLG", "SR-DGE", "SR-DGE", "SR-4GL", "SR-4GLS", and "SR- SEP" (produced by Sakamoto Yakuhin Kogyo Co., Ltd.); and alicyclic epoxy resins, such as "CELLOXIDE 2021P" (produced by Daicel Corporation).

From the viewpoints of the water resistance and the smoothness of a resin coating to be formed, the epoxy equivalent weight of the above-mentioned epoxy resin is preferably within the range of 110 to 500, more preferably within the range of 115 to 350, and even more preferably within the range of 125 to 250.

From the viewpoint of the water resistance of a resin coating to be formed, the number average molecular weight of the above-mentioned epoxy resin is preferably within the range of 170 to 2,800, more preferably within the range of 200 to 800, and even more preferably within the range of 300 to 500.

The above-mentioned curing agent is not particularly restricted and examples thereof include known compounds to be used as a curing agent of an epoxy resin, such as acid anhydrides, polyamine compounds having two or more amino groups, phenol resin, thiol compounds, and silanol compounds.

Specific examples of the acid anhydrides include styrene-maleic anhydride copolymers, alpha-olefin-maleic anhydride copolymers, pyromellitic anhydride, trimellitic anhydride, benzophenone tetracarboxylic anhydride, methylcyclohexene tetracarboxylic anhydride, tetrahydrophthalic anhydride, hexahydrophthalic anhydride, and methyltetrahydrophthalic anhydride. Two or more members of these may be used in combination.

Specifically, examples of the polyamine compound having two or more amino groups include an aliphatic amine, alicyclic and heterocyclic amines, an aromatic amine, a modified amine, an imidazole compound, an imidazoline compound, and an amide compound.

Examples of the aliphatic amine include ethylenediamine, trimethylenediamine, triethylenediamine, tetramethylenediamine, hexamethylenediamine, diethylenetriamine, triethylenetetramine, tetraethylenepentamine, dipropylenediamine, dimethylaminopropylamine, diethylaminopropylamine, trimethylhexamethylenediamine, pentanediamine, bis(2-dimethylaminoethyl)ether, pentamethyldiethylenetriamine, alkyl-t-monoamines, 1,4-diazabicyclo(2,2,2)octane(triethylenediamine), N,N,N',N'-tetramethylhexamethylenediamine, N,N,N',N'-tetramethylpropylenediamine, N,N,N',N'-tetramethylethylenediamine, N,N-dimethylcyclohexylamine, dibutylaminopropylamine, dimethylaminoethoxyethoxyethanol, triethanolamine, and dimethylaminohexanol.

Examples of the alicyclic and heterocyclic amines include piperidine, piperazine, menthanediamine, isophoronediamine, methylmorpholine, ethylmorpholine, N,N',N''-tris(dimethylaminopropyl)hexahydro-s-triazine, 3,9-bis(3-aminopropyl)-2,4,8,10-tetraoxyspiro(5,5)undecane adduct, N-aminoethylpiperazine, trimethylaminoethylpiperazine, bis(4-aminocyclohexyl)methane, N,N'-dimethylpiperazine, and 1,8-diazabicyclo[4.5.0]undecene-7.

Examples of the aromatic amine include o-phenylenediamine, m-phenylenediamine, p-phenylenediamine, diaminodiphenylmethane, diaminodiphenylsulfone, N-benzylmethylamine, N,N-dimethylbenzylamine, m-xylenediamine, pyridine, picoline, and alpha-methylbenzylmethylamine.

Examples of the modified amine include epoxy compound addition polyamines, Michael addition polyamines, Mannich addition polyamines, thiourea addition polyamines, ketone-blocked polyamines, dicyandiamide, guanidine, organic acid hydrazides, diaminomaleonitrile, aminimides, boron trifluoride-piperidine complex, and boron trifluoride-monoethylamine complex.

Examples of the imidazole compound include imidazole, 1-methylimidazole, 2-methyl imidazole, 3-methylimidazole, 4-methylimidazole, 5-methylimidazole, 1-ethylimidazole, 2-ethylimidazole, 3-ethylimidazole, 4-ethylimidazole, 5-ethylimidazole, 1-n-propylimidazole, 2-n-propylimidazole, 1-isopropylimidazole, 2-isopropylimidazole, 1-n-butylimidazole, 2-n-butylimidazole, 1-isobutylimidazole, 2-isobutylimidazole, 2-undecyl-1H-imidazole, 2-heptadecyl-1H-imidazole, 1,2-dimethylimidazole, 1,3-dimethylimidazole, 2,4-dimethylimidazole, 2-ethyl-4-methylimidazole, 1-phenylimidazole, 2-phenyl-1H-imidazole, 4-methyl-2-phenyl-1H-imidazole, 2-phenyl-4-methylimidazole, 1-benzyl-2-methylimidazole, 1-benzyl-2-phenylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 2-phenylimidazole isocyanuric acid adduct, 2-methylimidazole isocyanuric acid adduct, 2-phenyl-4,5-dihydroxymethylimidazole, 2-phenyl-4-methyl-5-hydroxymethylimidazole, 1-cyanoethyl-2-phenyl-4,5-di(2-cyanoethoxy)methylimidazole, 1-dodecyl-2-methyl-3-benzylimidazolium chloride, and 1-benzyl-2-phenylimidazole hydrochloride.

Examples of the imidazoline compound include 2-methylimidazoline and 2-phenylimidazoline.

Examples of the amide compound include polyamides obtained by the condensation of dimer acids and polyamines.

The phenol resin encompasses monomers, oligomers, and polymers having two or more phenolic hydroxyl groups in one molecule, and they are not particularly limited with respect to molecular weight or molecular structure; examples thereof include novolac type resins, such as phenol novolac resin, cresol novolac resin, and naphthol novolac resin; modified phenol resins, such as dicyclopentadiene-modified phenol resin and terpene-modified phenol resin; polyfunctional phenol resins, such as triphenolmethane type phenol resin; aralkyl type resins, such as phenol aralkyl resins (having a phenylene skeleton, a biphenylene skeleton, etc.), and naphthol aralkyl resins (having a phenylene skeleton, a biphenylene skeleton, etc.); and sulfur atom-containing type phenol resins, such as bisphenol S; these may be used singly or two or more of them may be used in combination.

The thiol compound is not particularly restricted, and examples thereof include thiol compounds represented by general formula (1):

[Chemical Formula 1]

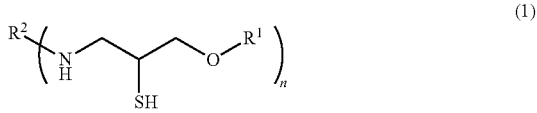

(1)

wherein $R^1$ and $R^2$ each independently represent an aromatic hydrocarbon group and n is an integer of 2 to 4.

The silanol compound is not particularly restricted, and examples thereof include alkoxysilanes represented by the following general formula (2) and/or epoxysilane coupling agents.

[Chemical Formula 2]

$$R^1{}_{4-n}Si(OR^2)_n \qquad (2)$$

wherein $R^1$ represents an alkyl group having 1 to 10 carbon atoms, a phenyl group, or a fluorinated alkyl group in which at least some hydrogen atoms have been substituted with fluorine, $R^2$ represents an alkyl group having 1 to 3 carbon atoms, and n represents 2, 3, or 4.

The alkoxysilanes represented by the above general formula (2) are not particularly restricted and examples thereof include methyltrimetoxysilane, dimethyldimethoxysilane, phenyltrimethoxysilane, diphenyldimethoxysilane, tetraethoxysilane, methyltriethoxysilane, dimethyldiethoxysilane, phenyltriethoxysilane, n-propyltrimethoxysilane, n-propyl triethoxysilane, hexyltrimethoxysilane, hexyltriethoxysilane, decyltrimethoxysilane, and trifluoropropyl trimetoxysilane.

The above-mentioned epoxysilane coupling agents are compounds having an alkoxysilyl group and an epoxy group in one molecule and are not particularly restricted as long as they are compounds having such a structure. Their commercially available products may be used. Specifically, examples of such compounds include compounds represented by the following general formula (3):

[Chemical Formula 3]

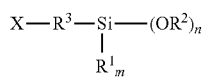

(3)

wherein n is any integer of 1 to 3, m is an integer of 0 to 2, n+m=3; $R^1$ and $R^2$ each independently represent a hydrocarbon group having 1 to 5 carbon atoms; $R^3$ represents an alkylene group having 1 to 5 carbon atoms; and X represents a glycidyl group or an epoxycyclohexyl group.

Specifically, examples of the compound represented by the above general formula (3) include 2-(3,4-epoxycyclohexyl) ethyltrimethoxysilane, 3-glycidoxypropylmethyldimetoxysilane, 3-glycidoxypropyltrimetoxysilane, 3-glycidoxypropylmethyldiethoxysilane, and 3-glycidoxypropyltriethoxysilane. Such silanol compounds each may be used singly or two or more of them may be used in combination.

The blending ratio of the epoxy resin to the curing agent is preferably (the epoxy equivalent weight of the epoxy resin)/ (the equivalent weight of the curing agent)=from 0.9 to 1.1 (equivalent ratio). To adjust the ratio to within the above range is preferred from the viewpoint that no deterioration in physical property is caused by poor curing.

The curing aid that can be used as required is not particularly restricted, and examples thereof include those capable of being used commonly for curing of epoxy resins. Examples thereof include organic phosphine compounds, such as trimethylphosphine, triethylphosphine, tributylphosphine, triphenylphosphine, tri(p-methylphenyl)phosphine, tri(nonylphenyl)phosphine, methyldiphenylphosphine, dibutylphenylphosphine, tricyclohexylphosphine, bis(diphenylphosphino)methane, 1,2-bis(diphenylphosphino)ethane, tetraphenylphosphonium tetraphenylborate, triphenylphosphine tetraphenylborate, and triphenylphosphine triphenylborane; tertiary amine compounds, such as 1,8-diazabicyclo[5,4,0]undecene-7 (DBU), triethylamine, triethylenediamine, benzyldimethylamine, alpha-methylbenzyldimethylamine, triethanolamine, dimethylaminoethanol, and tris(dimethylaminomethyl)phenol; and imidazole compounds, such as 2-heptadecylimidazole, 2-methylimidazole, 2-ethylimidazole, 2-phenylimidazole, 2-phenyl-4-methylimidazole, 4-methylimidazole, 4-ethylimidazole, 2-phenyl-4-hydroxymethylimidazole, 2-ethyl-4-methylimidazole, 1-cyanoethyl-2-methylimidazole, 2-phenyl-4-methyl-5-hydroxymethylimidazole, and 2-phenyl-4,5-dihydroxymethylimidazole. These may be used singly or two or more of them may be used in admixture.

The shape, the size, etc. of the coated magnesium oxide particles of the present invention are not particularly limited and they may be determined arbitrarily according to the application or the purpose of use. For example, preferably the (median diameter)/(specific surface area diameter determined from specific surface area (henceforth represented by SSA diameter)) ratio is 2 or less, and the Dmax/(specific surface area diameter determined from specific surface area) is 4 or less. Such coated magnesium oxide particles are preferred in that they can be used particularly suitably as heat-releasing filler.

When using magnesium oxide particles as a heat-radiating material, increase in filling ratio of particles in a composition has been desired in order to obtain high heat dissipation. In order to obtain a high filling ratio, it is important to control the state of aggregation and particle size distribution. Therefore, magnesium oxide particles whose state of aggregation and shape were highly controlled are desired. For accomplishing such an objective, it is preferred to use coated magnesium oxide particles that satisfy the above-described specific parameters.

Moreover, the use of coated magnesium oxide particles whose particle diameter and shape are controlled as described above, in a combination of a plurality of particles differing in particle diameter is preferred in that a higher filling ratio can be achieved and excellent heat-releasing performance can be obtained.

The above-mentioned (median diameter)/(SSA diameter) ratio is a value that indicates the degree of aggregation of particles. The median diameter is the particle diameter that reflects the secondary particle diameter and the SSA diameter is the particle diameter that reflects the primary particle diameter. Therefore, the above-mentioned ratio serves as a parameter that indicates the number of the primary particles that constitute a secondary particle. The feed magnesium oxide particles to be used for the present invention are magnesium oxide particles comprising secondary particles formed from a relatively small number of primary particles aggregated. Coated magnesium oxide particles obtained using such particles are advantageous in that they excel in dispersibility in resin, oil, or the like and are suitable especially for heat-releasing materials.

The feed magnesium oxide particles to be used for the present invention preferably have a (median diameter)/(SSA diameter) ratio of 2 or less, more preferably 1.8 or less, and even more preferably 1.6 or less.

The median diameter is also referred to as D50. When a powder is divided in terms of size at a certain particle diameter into two portions, i.e., a larger portion and a smaller portion, with equal amounts, the certain particle diameter is defined as the median diameter. While D50 is a value obtained by measuring distribution of particle diameter, the distribution of particle diameter is, in the present invention, a value obtained by using a laser diffraction particle size distribution analyzer (Microtrac MT 3300 EX manufactured by Nikkiso Co., Ltd.).

The SSA diameter is a value calculated, on the basis of the premise that particles are true spheres, from a BET specific surface area measured by a usual method.

Preferably, the feed magnesium oxide particles have a Dmax/(SSA diameter) ratio of 4 or less. The Dmax/(SSA diameter) ratio is a parameter that indicates the frequency of coarse secondary particles formed from many primary particles strongly aggregated, and the case that the value thereof is 4 or less is preferred in that there are few coarse aggregated secondary particles and the particles excel in dispersibility into resin or in processability. The Dmax/(SSA diameter) ratio is more preferably 3.9 or less, and even more preferably 3.8 or less.

In this specification, Dmax indicates the value of the largest particle diameter shown in a particle size distribution chart measured with a laser diffraction particle size distribution analyzer (Microtrac MT 3300 EX manufactured by Nikkiso Co., Ltd.).

While the coated magnesium oxide particles of the present invention are not limited with respect to particle diameter, it is preferred that the median diameter thereof is 0.1 to 25 µm. That is, coated magnesium oxide particles having a particle diameter within the above-described wide range can be used as a heat-releasing material and such particles are allowed to have an arbitrary size needed to obtain a high filling ratio.

While the coated magnesium oxide particles of the present invention are not limited with respect to particle diameter, it is preferred that the SSA diameter thereof is 0.1 to 15 µm. That is, coated magnesium oxide particles having a particle diameter within the above-described wide range can be used as a heat-releasing material and such particles are allowed to have an arbitrary size needed to obtain a high filling ratio.

While the coated magnesium oxide particles of the present invention are not limited with respect to particle diameter, it is preferred that the Dmax thereof is 0.3 to 50 µm. That is, coated magnesium oxide particles having a particle diameter within the above-described wide range can be used as a heat-releasing material and such particles are allowed to have an arbitrary size needed to obtain a high filling ratio.

While the coated magnesium oxide particles of the present invention are not limited with respect to particle shape, examples of the particle shape include a needle like shape, a bar like shape, a plate like shape, and a spherical shape, and the particles preferably have a shape as close to spherical as possible. The shape of particles can be observed with a scanning electron microscope (JSM840F manufactured by JEOL).

It is preferred for the coated magnesium oxide particles of the present invention that the coating amount of the epoxy resin is not less than 0.01 part by weight and not more than 50 parts by weight per 100 parts by weight of magnesium oxide. The case that the coating amount is less than 0.01 part by weight is undesirable in that neither sufficient acid resistance nor sufficient water resistance can be obtained. The case that the coating amount exceeds 50 parts by weight is undesirable in that physical properties which magnesium oxide inherently has cannot fully be demonstrated. The coating amount is more preferably 0.02 part by weight or more, and even more preferably 0.05 part by weight or more. The coating amount is more preferably 40 parts by weight or less, and even more preferably 20 parts by weight or less.

The coated magnesium oxide particles of the present invention may further have been surface-treated on the coating of the epoxy resin. The application of the surface treatment is preferred in that acid resistance and water resistance can be further improved. It is preferred also in that affinity with a resin, a grease, etc. can be enhanced by imparting performances such as hydrophobicity and hydrophilicity to the surface.

Preferably, the above-mentioned surface treatment improves hydrophobicity and also maintains electric conductivity in a low state. That is, if the coating film formed by surface treatment has high electric conductivity, this cannot maintain low electric conductivity of magnesium oxide. Therefore, in use especially for electric/electronic material applications, additional surface treatment is preferably carried out.

It is preferred from the above-described viewpoint, the surface treatment is one carried out with an alkoxysilane represented by the above general formula (2) and/or an epoxysilane coupling agent. Concerning a specific one of such compounds, the same compounds as examples of the silanol compound described as the above-described curing agent can be used.

In the above-described surface treatment, it is preferred to form a coating layer in an amount of 0.1 to 20% by mass relative to the coated magnesium oxide particles after the surface treatment. The application of coating in such an amount can further improve water resistance, acid resistance, etc. while maintaining a low electric conductivity.

The above-described coated magnesium oxide particles of the present invention are not restricted with respect to the method for the production thereof; for example, the particles can be produced by a production method comprising step (1) of preparing a slurry comprising magnesium oxide particles, an epoxy resin, and an epoxy resin curing agent, and step (2) of spray drying the slurry obtained in the above step (1). In this production method, the time during which magnesium oxide particles are in contact with water is shorter than in conventional methods for coating powders with resin, and therefore the method is one preferred in that conversion of magnesium oxide into magnesium hydroxide is suppressed.

Such a method for producing coated magnesium oxide particles is also one embodiment of the present invention.

The magnesium oxide particles to be used as a raw material (henceforth referred to as feed magnesium oxide particles) are not particularly limited with respect to their shape, particle diameter, etc. and those of any configurations can be used. In order to obtain coated magnesium oxide particles having a (median diameter)/(SSA diameter) ratio of 2 or less and a Dmax/(SSA diameter) ratio of 4 or less that are suited for use as a heat-releasing filler, it is preferred that the feed magnesium oxide particles have a (median diameter)/(SSA diameter) ratio of 2 or less and a Dmax/(SSA diameter) ratio of 4 or less.

Although the method for producing such feed magnesium oxide particles is not particularly restricted, the particles can be produced, for example, by the method disclosed in detail in WO 2011/007638. The feed magnesium oxide particles obtained by such a method may, as required, be subjected to pulverization, classification with a screen, etc. Examples of the method for the classification with a screen include wet classification and dry classification.

The preparation of the slurry in the above step (1) is the step of preparing the slurry by dispersing the above-mentioned feed magnesium oxide particles, the epoxy resin, and the curing agent in a liquid medium.

The method for preparing the slurry is not particularly restricted, and, for example, a uniform slurry having a feed magnesium oxide particles content of 500 to 1000 g/l can be formed by adding the above-mentioned ingredients in the liquid medium, and stirring them at 18 to 30° C. for 10 to 30 minutes to disperse and/or dissolve them.

In the above slurry, the liquid medium is not particularly restricted, but it is preferably composed of 90% by weight or less of water and a water-miscible solvent as the remainder. The use of such a liquid medium having a lower water content is preferred in that the conversion of magnesium oxide into magnesium hydroxide can thereby be suppressed. Any solvent capable of being mixed with water in any proportions is not particularly restricted as the above-mentioned water-miscible solvent and examples of such a solvent include methanol, ethanol, isopropanol, acetone, and ethylene glycol. Two or more of these may be used at the same time. Especially, lower alcohols are preferred from the cost aspect, or the like. The water content is more preferably 85% by weight or less, even more preferably 80% by weight or less, relative to the entire portion of the liquid medium. The lower limit of the water content is not particularly limited, and a solvent made up of only a water-miscible organic solvent free from water may be used.

In the above step (1), a dispersing agent may be used in the event that a slurry is formed. While the agent that can be used suitably as the dispersing agent is not particularly restricted, it is preferred to use ammonium polycarboxylate. Ammonium polycarboxylate is preferred in that the use thereof as a dispersing agent will eliminate the need for the addition of a curing aid because ammonium polycarboxylate also has an action as a curing aid for an epoxy resin. Examples of the ammonium polycarboxylate include Dispex A40 (produced by Ciba Specialty Chemicals), and POIZ 532A (produced by Kao Corporation).

In the case that the reaction between the epoxy resin and the curing agent hardly proceeds spontaneously in the above step (1), the above-mentioned curing aid may further be contained.

The method for producing the above-described coated magnesium oxide particles comprises step (2) of spray drying the slurry obtained in the above step (1).

The method of the spray drying is not particularly restricted and may be, for example, a method in which the above-described slurry is sprayed with a two-fluid nozzle, a rotary disc, or the like into an air flow, preferably, at about 150 to 300° C. to form granulated particles of about 20 to 100 μm. In this operation, it is preferred to control the slurry concentration so that the viscosity of the slurry may become 50 to 3500 cps. The viscosity of the slurry is a value measured with a B type viscometer (manufactured by Tokyo Keiki Co., Ltd.) under a shear of 60 rpm. The granulated particles dried in the air flow are collected with a submicron filter (bag filter). When the viscosity of the slurry, the drying temperature, and the velocity of the air flow are not within desirable ranges, the granulated particles may have a hollow form or a depressed form.

The coated magnesium oxide particles produced by the above method may be ones that will, as required, be subjected to pulverization and classification with a screen. The means for the pulverization is not particularly restricted, and examples thereof include an atomizer. Examples of the method for the classification with a screen include wet classification and dry classification.

The application of the coated magnesium oxide particles of the present invention is not particularly restricted, and the particles can be used suitably, for example, in a heat-releasing filler application. Such a heat-releasing filler is also a part of the present invention.

The heat-releasing filler made of the coated magnesium oxide particles of the present invention can usually be used in a heat-releasing resin composition, a heat-releasing grease, a heat-releasing paint, etc. Such applications have been described in many pieces of published literature, and the heat-releasing filler of the present invention can be used in such known heat-releasing resin composition, heat-releasing grease, and heat-releasing paint.

When using the coated magnesium oxide particles of the present invention as a heat-releasing filler, a plurality of coated magnesium oxide particles that each satisfy the requirements of the present invention and differ in particle diameter may be mixed and used. More specific examples include coated magnesium oxide particles obtained by choosing (a) coated magnesium oxide having a primary particle diameter of 1 to 15 μm as determined by a measurement method using an image taken with the above-described electron microphotographing apparatus and (b) coated magnesium oxide having a primary particle diameter of 0.05 to 4 μm in such proportions that their particle diameter ratio may be $4 \leq (a)/(b) \leq 20$, and mixing them in a weight ratio of (a):(b) =5:5 to 9:1.

Three or more kinds of coated magnesium oxide particles may also be combined. In the case of combining three kinds of coated magnesium oxide particles, the above-described (a) coated magnesium oxide particles having a primary particle diameter of 1 to 15 μm as determined by a measurement method using an image taken with the electron microphotographing apparatus, (b) coated magnesium oxide particles having a primary particle diameter of 0.05 to 4 μm, and (c) coated magnesium oxide particles having a primary particle diameter of 0.01 to 1 μm are used in combination; one example is coated magnesium oxide particles obtained by choosing particles in such proportions that their particle diameter ratios may be $4 \leq (a)/(b) \leq 20$ and $4 \leq (b)/(c) \leq 20$, and mixing them in weight ratios of (a): ((b)+(c))=5:5 to 9:1 and (b): (c)=5:5 to 9:1 relative to the overall amount of coated magnesium oxide particles.

As described above, to choose and mix a plurality of coated magnesium oxide particles differing in particle diameter in a combination capable of affording a high filling ratio is preferred in that a higher filling ratio can be achieved and excellent heat-releasing performance can be obtained.

In the case of being used as a heat-releasing filler, the coated magnesium oxide particles of the present invention can be used together with additional ingredients. Examples of such additional ingredients that can be used in combination include heat-releasing fillers other than magnesium oxide such as metal oxides including zinc oxide, titanium oxide, and aluminum oxide, magnesium carbonate, aluminum nitride, boron nitride, silicon carbide, silicon nitride, titanium nitride, metal silicon, and diamond, magnesium oxide particles different from the coated magnesium oxide particles of the present invention, resin, and surfactants.

When the coated magnesium oxide particles are used as a heat-releasing filler, the particles can be used in the form of a resin composition in which the particles are mixed with a resin. Such a resin composition is also one embodiment of the present invention. In this case, the resin to be used may be either a thermoplastic resin or a thermosetting resin, and examples thereof include such resins as an epoxy resin, phenolic resin, polyphenylene sulfide (PPS) resin, polyester-based resin, polyamide, polyimide, polystyrene, polyethylene, polypropylene, polyvinyl chloride, polyvinylidene chloride, fluororesin, polymethyl methacrylate, ethylene ethyl acrylate copolymer (EEA) resin, polycarbonate, polyurethane, polyacetal, polyphenylene ether, polyetherimide, acrylonitrile-butadiene-styrene copolymer (ABS) resin, liquid crystal resin (LCP), silicone resin, and acrylic resin.

The resin composition of the present invention may be in any form, such as a resin composition for thermoforming obtained by kneading a thermoplastic resin with the above-described coated magnesium oxide particles in a molten state; and a resin composition obtained by kneading a thermosetting resin with the above-described coated magnesium oxide particles, followed by heating and curing.

The blending amount of the above-mentioned coated magnesium oxide particles in the resin composition of the present invention can be determined arbitrarily according to the performance of the resin composition, such as the desired thermal conductivity and the desired hardness of the resin composition. In order to fully develop the heat-releasing performance of the coated magnesium oxide particles, the particles are preferably contained in an amount of 10 to 90% by volume relative to the total solid content of the resin composition. The above blending amount can be adjusted according to the required heat-releasing performance; in applications where a higher level of heat-releasing property is required, the particles are contained preferably in 30% by volume or more, more preferably in 50% by volume or more.

The resin composition of the present invention allows free choice of its resin component according to its application. For example, in the case of disposing the resin composition at between a heat source and a heat-releasing plate for sticking fast to each other, a resin that has high adhesiveness and low hardness such as silicone resin and acrylic resin is suitably chosen.

In the event that the resin composition of the present invention is a resin composition for thermoforming, it can be produced, for example, by a method that comprises pelletizing a resin composition by melt-kneading a thermoplastic resin and the above-described coated magnesium oxide particles using a screw type twin screw extruder, and then molding the resin composition into a desired shape by an arbitrary molding method, such as injection molding.

In the case that the resin composition of the present invention is a resin composition obtained by kneading a thermosetting resin with the above-described coated magnesium oxide particles, followed by heating and curing, the resin composition is preferably one that is to be molded by compression molding. Although the method for producing such a resin composition is not particularly restricted, the resin composition can be produced, for example, by molding by transfer molding.

Applications of the resin composition of the present invention include heat-releasing materials for electronic parts, heat-conductive fillers, and insulating fillers for temperature measurement. For example, the resin composition of the present invention can be used to transmit heat emitted by heat-generating electronic parts, such as MPU, power transistors, and transformers, to heat-releasing parts, such as heat-releasing fins and heat-releasing fans, and it can be sandwiched between heat-generating electronic parts and heat-releasing parts and then used. This can afford good heat transmission between heat-generating electronic parts and heat-releasing parts, so that it can reduce malfunction of heat-generating electronic parts over a long term. It can also be used suitably for connection between a heat pipe and a rectifier heat sink and connection between a module and a rectifier heat sink mounted in various heat-generating bodies.

In the case of using the above-described coated magnesium oxide particles as a heat-releasing filler, the particles can also be used in the form of a heat-releasing grease prepared by mixing with a base oil containing mineral oil or synthetic oil.

The blending amount of the above-described coated magnesium particles in the heat-releasing grease of the present invention can be arbitrarily determined according to the desired thermal conductivity. In order to fully develop the heat-releasing performance of the coated magnesium oxide particles, the particles are preferably contained in an amount of 10 to 90% by volume relative to the overall amount of the heat-releasing grease. The above blending amount can be adjusted according to the required heat-releasing performance; in applications where a higher level of heat-releasing property is required, the particles are contained preferably in 30% by volume or more, more preferably in 50% by volume or more.

As the base oil, various oil materials, such as mineral oil, synthetic oil, silicone oil, and fluorine-containing hydrocarbon oil, can be used singly or in combination. Especially, hydrocarbon oils are preferred as the synthetic oil. There can be used alpha-olefins, diesters, polyol esters, trimellitic acid esters, polyphenyl ethers, alkylphenyl ethers, etc. as the synthetic oil.

The heat-releasing grease of the present invention may comprise a surfactant as required. A nonionic surfactant is preferred as the above-mentioned surfactant. The incorporation of a nonionic surfactant makes it possible to increase thermal conductivity and control the consistency appropriately.

Examples of the nonionic surfactants include polyoxyethylene alkyl ether, polyoxyethylene alkyl phenyl ether, polyoxyethylene alkyl naphthyl ether, polyoxyethylene castor oil, polyoxyethylene hardened castor oil, polyoxyethylene alkyl amide, polyoxyethylene-polyoxypropylene glycol, polyoxyethylene-polyoxypropylene glycol ethylenediamine, decaglycerol aliphatic acid ester, polyoxyethylene monofatty acid ester, polyoxyethylene difatty acid ester, polyoxyethylene propylene glycol fatty acid ester, polyoxyethylene sorbitan monofatty acid ester, polyoxyethylene sorbitan trifatty acid ester, ethylene glycol monofatty acid ester, diethylene glycol monofatty acid ester, propylene glycol monofatty acid ester, glycerol monofatty acid ester, pentaerythritol monofatty acid ester, sorbitan monofatty acid ester, sorbitan sesquifatty acid ester, and sorbitan trifatty acid ester.

The effect of the addition of a nonionic surfactant varies depending upon the type and the blending amount of the heat-releasing filler, and HLB (hydrophile-lipophile balance) that indicates the balance between hydrophilicity and lipophilicity. In order to obtain a satisfactory consistency even at room temperature, the nonionic surfactant to be used in this embodiment is a liquid surfactant that has an HLB of 9 or less. In applications in which deterioration in electrically insulating property or electric resistance is not emphasized, such as highly heat-releasing grease, an anionic surfactant, a cationic surfactant, and an amphoteric surfactant can be used.

The heat-releasing grease of the present invention can be prepared by mixing the above-mentioned ingredients by using a mixing machine, such as a dough mixer (a kneader), a gate mixer, a planetary mixer, and a three-roll mill.

The heat-releasing grease of the present invention is used by applying to an heat-generating body or a heat-releasing body. Examples of the heat-generating body include common electric power sources; electronic instruments, such as a power transistor for electric power sources, a power module, a thermistor, a thermocouple, and a temperature sensor; and heat-generating electronic parts including integrated circuit devices, such as an LSI and a CPU. Examples of the heat-releasing body include heat-releasing parts, such as a heat spreader and a rectifier heat sink; heat pipes, and heat-releasing plates. The application can be carried out, for example, by screen printing. The screen printing can be carried out, for example, by using a metal mask or a screen mesh. The application of the heat-releasing grease of the present invention to between an heat-generating body and a heat-releasing body makes it possible to transmit heat efficiently from the heat-generating body to the heat-releasing body and therefore heat can be removed effectively from the heat-generating body.

When the coated magnesium oxide particles are used as a heat-releasing filler, the particles can be used also in the form of a coating composition in which the particles are dispersed in a resin solution or a dispersion liquid. In this case, the resin to be used either may or may not have curability. Specific examples of the resin include the resins provided as examples of the resin that can be used for the above-described resin composition. The coating composition may be either solvent-borne one containing an organic solvent or water-borne one in which resin is dissolved or dispersed in water.

The above-described coating composition is not particularly restricted in the method for the production thereof and it can be produced, for example, by mixing and dispersing the required raw materials and a solvent by using a disper, a bead mill, or the like.

The blending amount of the coated magnesium oxide particles in the above heat-releasing coating composition can be determined arbitrarily according to a desired thermal conductivity. In order to fully develop the heat-releasing performance of the coated magnesium oxide particles, the particles are preferably contained in an amount of 10 to 90% by volume relative to the overall amount of the coating composition. The blending amount can be adjusted according to the required heat-releasing performance, and in applications in which higher heat-releasing property is required, the particles are preferably contained in an amount of 30% by volume or more, more preferably 50% by volume or more.

The coated magnesium oxide particles of the present invention can be used in the fields of a vulcanization accelerator for rubber, pigment for paint and ink, drugs, etc. as well as for the above-described heat-releasing filler.

EXAMPLES

The present invention will be illustrated in more detail by way of examples, but the present invention is not limited only to the examples. Unless otherwise stated in Examples and Comparative Examples, "%" means % by mass.

Example 1

Magnesium Oxide Particles-a

To 8 L of water is added 2 L of isopropyl alcohol, and then under strong stirring, 55.5 g of an epoxy resin (jER 828 produced by Mitsubishi Chemical Corporation; bisphenol A type epoxy resin), 44.5 g of a curing agent (RIKACID MH-700 produced by New Japan Chemical Co., Ltd.; 4-methylhexahydrophthalic anhydride/hexahydrophthalic anhydride=70/30), and 30 g of Dispex A40 (produced by Ciba Specialty Chemicals) are added. Subsequently, 10000 g of MgO particles having a median diameter of 1.9 μm are added and strongly stirred for 10 minutes to afford a slurry. This slurry was treated with a spray drier (L-12 manufactured by Ohkawara Kakohki Co., Ltd.) under conditions typified by an inlet hot air temperature of 230° C. and an outlet temperature of 105° C. for 1 hour, dried at 120° C. for 12 hours, and then pulverized, affording magnesium oxide particles-a treated with an epoxy resin.

Example 2

Magnesium Oxide Particles-b

Magnesium oxide particles-b were obtained by carrying out the same operations as those in Example 1 except that 5.55 g of an epoxy resin (jER 828 produced by Mitsubishi Chemical Corporation), 4.45 g of a curing agent (RIKACID MH-700 produced by New Japan Chemical Co., Ltd.), 3.0 g of Dispex A40 (produced by Ciba Specialty Chemicals), and MgO particles having a median diameter of 12 μm were used.

Example 3

Magnesium Oxide Particles-c

Magnesium oxide particles-c were obtained by carrying out the same operations as those in Example 1 except that 555 g of an epoxy resin (jER 828 produced by Mitsubishi Chemical Corporation), 445 g of a curing agent (RIKACID MH-700 produced by New Japan Chemical Co., Ltd.), 300 g of Dispex A40 (produced by Ciba Specialty Chemicals), and MgO particles having a median diameter of 0.18 μm were used.

Example 4

Magnesium Oxide Particles-d

To 800 ml of water was added 200 ml of isopropanol, and then 10 g of hexyltrimethoxysilane (KBM-3063 produced by Shin-Etsu Chemical Co., Ltd.) and 0.2 g of acetic acid (produced by Wako Pure Chemical Industries, Ltd.) were added. After stirring for about 30 minutes, 1000 g of the magnesium oxide particles-a obtained in Example 1 were added, stirred for 30 minutes, and followed by filtration, washing with water, drying, and pulverization, affording magnesium oxide particles-d in which the surface of the magnesium oxide particles, having already treated with an epoxy resin, was treated with hexyltrimethoxysilane.

Example 5

Magnesium Oxide Particles-e

To 800 ml of water was added 200 ml of isopropanol, and then 10 g of 3-glycidoxypropyltrimetoxysilane (KBM-403 produced by Shin-Etsu Chemical Co., Ltd.) was added. After stirring for about 30 minutes, 1000 g of the magnesium oxide particles-a obtained in Example 1 were added, stirred for 30 minutes, and followed by filtration, washing with water, drying, and pulverization, affording magnesium oxide particles-e in which the surface of the magnesium oxide particles, having already treated with an epoxy resin, was treated with 3-glycidoxypropyltrimetoxysilane.

Comparative Example 1

Magnesium Oxide Particles-f

Magnesium oxide particles-f were obtained by carrying out the same operations as those in Example 1 except that Dispex A40 failed to be used. Under such treating conditions, since the curing reaction between the epoxy resin and the curing agent did not proceed sufficiently, no coating with a cured epoxy resin could be carried out.

Comparative Example 2

Magnesium Oxide Particles-g

Magnesium oxide particles-g were obtained by carrying out the same operations as those in Example 1 except that the epoxy resin, the epoxy resin curing agent, and Dispex A40 failed to be used.

Comparative Example 3

Magnesium Oxide Particles-h

Magnesium oxide particles-h treated with 1% of $SiO_2$ were obtained by carrying out the same operations as those in Example 1 except that the epoxy resin, the epoxy resin curing agent, and Dispex A40 failed to be used and 334 g of silica sol (SNOWTEX N-30G produced by Nissan Chemical Industries, Ltd., $SiO_2$ content: 30% by weight) was added, and then performing calcination at 650° C. for 3 hours.

Comparative Example 4

Magnesium Oxide Particles-i

Magnesium oxide particles-i treated with 3% of $SiO_2$ were obtained by carrying out the same operations as those in Example 1 except that the epoxy resin, the epoxy resin curing agent, and Dispex A40 failed to be used and 1000 g of silica sol (SNOWTEX N-30G produced by Nissan Chemical Industries, Ltd., $SiO_2$ content: 30% by weight) was added, and then performing calcination at 650° C. for 3 hours.

The physical properties of the magnesium oxide particles before treatment of Examples 1 to 5 and Comparative Examples 1 to 4 are shown in Table 1.

Figure 2:
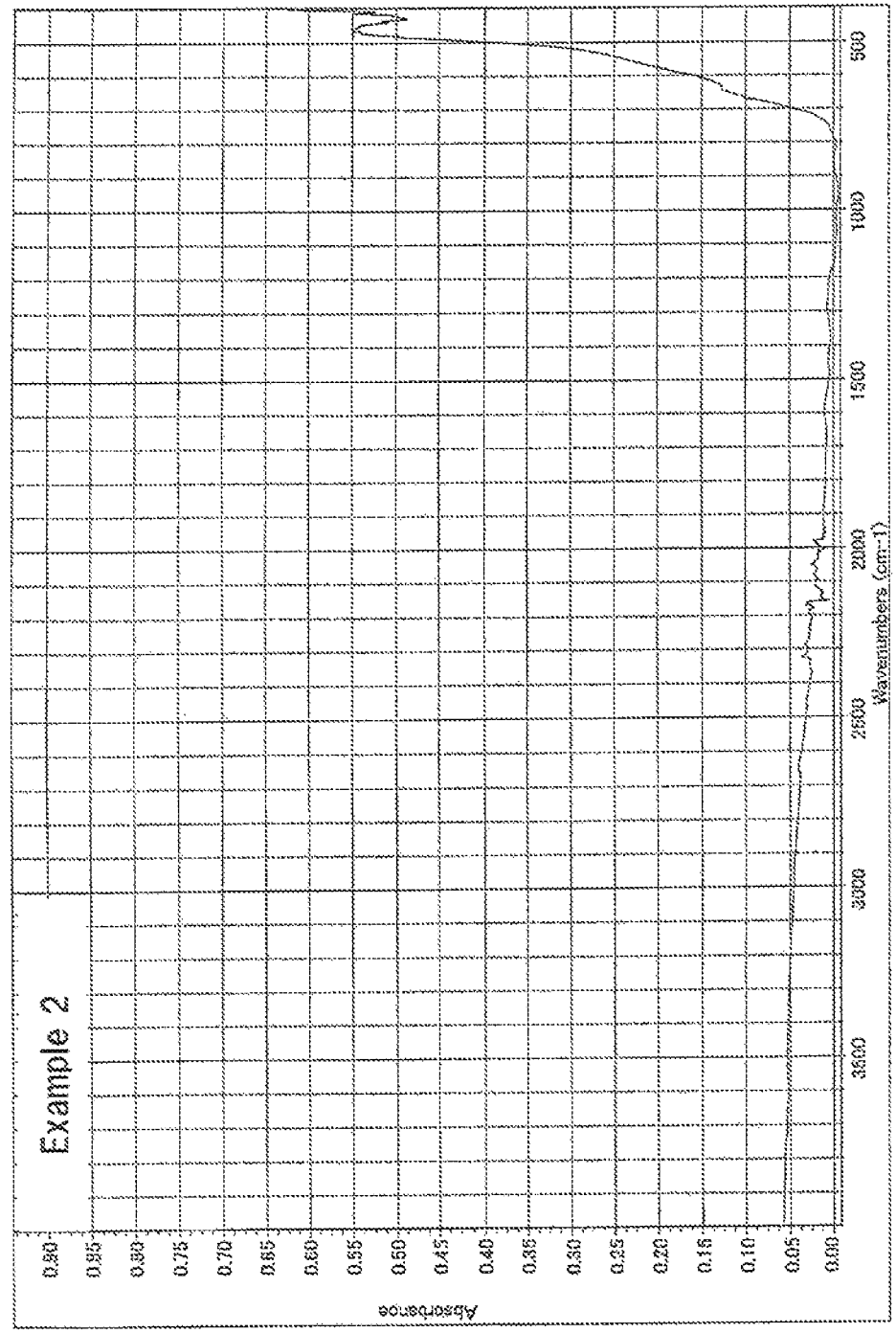
FIG. 2 is a diagram showing an IR chart of the coated magnesium oxide particles of Example 2 of the present invention.

The physical properties of the magnesium oxide particles after treatment of Examples 1 to 5 and Comparative Examples 1 to 4 are shown in Table 2. The values provided in Tables 1 and 2 are values measured by the measuring methods disclosed in this specification. The IR charts of the magnesium oxide particles of Examples 1 and 2 are shown in FIGS. 1 and 2. Since no absorption of 3700 cm$^{-1}$ is found in the measured results, it is apparent that the core particles are magnesium oxide particles. The measurement of IR was carried out by using NICOLET 4700 FT-IR manufactured by Thermo Electron Corporation.

TABLE 1

| Unit | Median diameter μm | SSA diameter μm | Dmax μm | Median diameter/ SSA diameter | Dmax/ median diameter |
|---|---|---|---|---|---|
| Example 1 | 1.90 | 2.10 | 6.00 | 0.90 | 3.16 |
| Example 2 | 12.0 | 12.5 | 33.9 | 0.96 | 2.83 |
| Example 3 | 0.18 | 0.12 | 0.69 | 1.50 | 3.83 |
| Example 4 | 1.90 | 2.10 | 6.00 | 0.90 | 3.16 |
| Example 5 | 1.90 | 2.10 | 6.00 | 0.90 | 3.16 |
| Comparative Example 1 | 1.90 | 2.10 | 6.00 | 0.90 | 3.16 |
| Comparative Example 2 | 1.90 | 2.10 | 6.00 | 0.90 | 3.16 |
| Comparative Example 3 | 1.90 | 2.10 | 6.00 | 0.90 | 3.16 |
| Comparative Example 4 | 1.90 | 2.10 | 6.00 | 0.90 | 3.16 |

TABLE 2

| Unit | Median diameter μm | SSA diameter μm | Dmax μm | Median diameter/ SSA diameter | Dmax/ median diameter | Dispex-A40 | Amount of epoxy resin w % | Amount of SiO2 w % | Surface treating agent |
|---|---|---|---|---|---|---|---|---|---|
| Example 1 | 2.1 | 2.0 | 6.0 | 1.05 | 2.86 | Present | 1 | 0 | — |
| Example 2 | 12.1 | 12.6 | 37.0 | 0.96 | 3.06 | Present | 0.1 | 0 | — |
| Example 3 | 0.20 | 0.15 | 0.75 | 1.33 | 3.75 | Present | 10 | 0 | — |
| Example 4 | 2.1 | 2.0 | 6.0 | 1.05 | 2.86 | Present | 1 | 0 | KBM-3063 1% |
| Example 5 | 2.1 | 2.0 | 6.0 | 1.05 | 2.86 | Present | 1 | 0 | KBM-403 1% |
| Comparative Example 1 | 2.0 | 2.1 | 6.0 | 0.95 | 3.00 | Absent | 1 | 0 | — |
| Comparative Example 2 | 1.9 | 2.1 | 5.9 | 0.90 | 3.11 | Absent | 0 | 0 | — |
| Comparative Example 3 | 2.1 | 1.15 | 6.5 | 1.83 | 3.10 | Absent | 0 | 1 | — |
| Comparative Example 4 | 2.2 | 0.49 | 6.5 | 4.49 | 2.95 | Absent | 0 | 3 | — |

Example 6

Magnesium Oxide Particles-j

To 8 L of water is added 2 L of isopropyl alcohol, and then under strong stirring, 82.3 g of an epoxy resin (jER 828 produced by Mitsubishi Chemical Corporation), 17.7 g of a curing agent (isophoronediamine produced by Wako Pure Chemical Industries, Ltd.), and 30 g of Dispex A40 (produced by Ciba Specialty Chemicals) are added. Subsequently, 10000 g of MgO particles with a median diameter of 1.9 μm are added as in Example 1, followed by strong stirring for slightly more than 10 minutes. This slurry was treated with a spray drier (L-12 manufactured by Ohkawara Kakohki Co., Ltd.) under conditions typified by an inlet hot air temperature of 230° C. and an outlet temperature of 105° C. for 1 hour, dried at 120° C. for 12 hours, and then pulverized, affording magnesium oxide particles-j treated with an epoxy resin.

Example 7

Magnesium Oxide Particles-k

Magnesium oxide particles-k were obtained by carrying out the same operations as those in Example 1 except that 90 g of an epoxy resin (jER 828 produced by Mitsubishi Chemical Corporation) and 10 g of a curing agent (diethylene triamine produced by Sumitomo Seika Chemicals Co., Ltd.) were used.

Example 8

Magnesium Oxide Particles-l

Magnesium oxide particles-l were obtained by carrying out the same operations as those in Example 1 except that 80.4 g of an epoxy resin (RE-303S-L produced by Nippon Kayaku Co., Ltd.; bisphenol F type) and 19.6 g of a curing agent (isophoronediamine produced by Wako Pure Chemical Industries, Ltd.) were used.

Example 9

Magnesium Oxide Particles-m

Magnesium oxide particles-m were obtained by carrying out the same operations as those in Example 1 except that 89.0 g of an epoxy resin (RE-303S-L produced by Nippon Kayaku Co., Ltd.; bisphenol F type) and 11.0 g of a curing agent (diethylene triamine produced by Sumitomo Seika Chemicals Co., Ltd.) were used.

Example 10

Magnesium Oxide Particles-n

Magnesium oxide particles-n were obtained by carrying out the same operations as those in Example 1 except that 76.6 g of an epoxy resin (CELLOXIDE 2021P produced by Daicel Corporation; alicyclic type) and 23.4 g of a curing agent (isophoronediamine produced by Wako Pure Chemical Industries, Ltd.) were used. CELLOXIDE 2021P is a compound that has a chemical structure represented by the following formula (4).

[Chemical Formula 4]

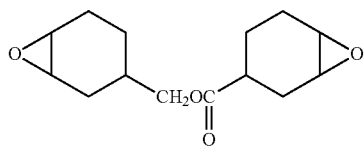

Example 11

Magnesium Oxide Particles-o

Magnesium oxide particles-o were obtained by carrying out the same operations as those in Example 1 except that 86.5 g of an epoxy resin (CELLOXIDE 2021P produced by Daicel Corporation; alicyclic type) and 13.5 g of a curing agent (diethylene triamine produced by Sumitomo Seika Chemicals Co., Ltd.) were used.

The physical properties of the magnesium oxide particles after treatment of Examples 1 and 6 to 11 are shown in Table 3.

TABLE 3

| Unit | Median diameter μm | SSA diameter μm | Dmax μm | Median diameter/ SSA diameter — | Dmax/ median diameter — | Kind of epoxy resin — | Curing agent — |
|---|---|---|---|---|---|---|---|
| Example 1 | 2.1 | 2.0 | 6.0 | 1.05 | 2.86 | Bisphenol A type | RIKACID MH-700 |
| Example 6 | 2.1 | 2.0 | 6.0 | 1.05 | 2.86 | Bisphenol A type | Isophoronediamine |
| Example 7 | 2.1 | 2.0 | 6.0 | 1.05 | 2.86 | Bisphenol A type | Diethylene triamine |
| Example 8 | 2.1 | 2.0 | 6.0 | 1.05 | 2.86 | Bisphenol F type | Isophoronediamine |
| Example 9 | 2.1 | 2.0 | 6.0 | 1.05 | 2.86 | Bisphenol F type | Diethylene triamine |
| Example 10 | 2.1 | 2.0 | 6.0 | 1.05 | 2.86 | Alicyclic | Isophoronediamine |
| Example 11 | 2.0 | 2.1 | 6.0 | 0.95 | 3.00 | Alicyclic | Diethylene triamine |

Examples 12 to 16

An epoxy resin composition molding of 40 mm in diameter and 7 mm in thickness was produced by kneading in the formulations shown in Table 4 by using a three-roll mill (M-80S manufactured by EXAKT) and processing at 110° C. for 12 hours. Using this molding, the thermal conductivity was measured. The measurement of the thermal conductivity was carried out at 25° C. by the heat flow meter technique. The results are shown in Table 4.

Comparative Example 5

An epoxy resin molding of 40 mm in diameter and 7 mm in thickness was produced by kneading in the formulations shown in Table 4 in a system free from magnesium oxide by using a three-roll mill (M-80S manufactured by EXAKT) and processing at 110° C. for 12 hours. Using this molding, the thermal conductivity was measured. The measurement of the thermal conductivity was carried out at 25° C. by the heat flow meter technique. The results are shown in Table 4.

Comparative Examples 6 to 9

An epoxy resin composition molding of 40 mm in diameter and 7 mm in thickness was produced by kneading in the formulations shown in Table 4 by using a three-roll mill (M-80S manufactured by EXAKT) and processing at 110° C. for 12 hours. Using this molding, the thermal conductivity was measured. The measurement of the thermal conductivity was carried out at 25° C. by the heat flow meter technique. The results are shown in Table 4.

TABLE 4

| | Unit | Comparative Example 5 | Example 12 | Example 13 | Example 14 | Example 15 | Example 16 | Comparative Example 6 | Comparative Example 7 | Comparative Example 8 | Comparative Example 9 |
|---|---|---|---|---|---|---|---|---|---|---|---|
| Epoxy resin (Bisphenol A type) | g | 7.5 | 7.18 | 7.5 | 4.35 | 7.18 | 7.18 | 7.18 | 7.5 | 7.5 | 7.5 |
| Epoxy resin wring agent (RIKACID MEI-700) | g | 6 | 5.75 | 6 | 3.48 | 5.75 | 5.75 | 5.75 | 6 | 6 | 6 |
| N, N-dimethylbenzylamine | g | 0.075 | 0.072 | 0.075 | 0.044 | 0.072 | 0.072 | 0.072 | 0.075 | 0.075 | 0.075 |
| Example 1 Magnesium oxide particles-a | g | | 57.6 | | | | | | | | |
| Example 2 Magnesium oxide particles-b | g | | | 57 | | | | | | | |
| Example 3 Magnesium oxide particles-c | g | | | | 62.7 | | | | | | |
| Example 4 Magnesium oxide particles-d | g | | | | | 57.6 | | | | | |
| Example 5 Magnesium oxide particles-e | g | | | | | | 57.6 | | | | |
| Comparative Example 1 Magnesium oxide particles-f | g | | | | | | | 57.6 | | | |
| Comparative Example 2 Magnesium oxide particles-g | g | | | | | | | | 57 | | |
| Comparative Example 3 Magnesium oxide particles-h | g | | | | | | | | | 56.6 | |
| Comparative Example 4 Magnesium oxide particles-1 | g | | | | | | | | | | 55.9 |
| Inorganic substance volume | v% | 0 | 60.0 | 60.0 | 60.0 | 60.0 | 60.0 | 60.0 | 60.0 | 60.0 | 60.0 |
| Thermal conductivity | W/mk | 0.21 | 3.0 | 3.1 | 2.9 | 2.9 | 2.9 | 2.9 | 2.9 | 2.7 | 2.3 |

The results in Table 4 clearly show that the resin compositions containing the coated magnesium oxide particles of the present invention have excellent heat-releasing performance.

Examples 17 to 21

Using the epoxy resin composition moldings of 40 mm in diameter and 7 mm in thickness prepared in Examples 12 to 16, a degradation test at a temperature of 121° C., a humidity of 100% for 20 hours was carried out by using a pressure cooker testing machine (PC-242HSR2 manufactured by Hirayama Manufacturing Corporation). In this test, the weight is measured before and after the test; a smaller increase in weight affords a better valuation. The results are shown in Table 5.

Comparative Examples 10 to 14

Using the epoxy resin moldings of 40 mm in diameter and 7 mm in thickness prepared in Comparative Examples 5 and 6 to 9, a pressure cooker test was carried out in the same way as in Examples 17 to 21. The results are shown in Table 5.

TABLE 5

| | Unit | Before test g | After test g | Increase g | Increase ratio % |
|---|---|---|---|---|---|
| Comparative Example 5 Blank | Comparative Example 10 | 7.51 | 7.62 | 0.11 | 1.46 |
| Example 1 Magnesium oxide particles-a | Example 17 | 22.51 | 22.59 | 0.08 | 0.36 |
| Example 2 Magnesium oxide particles-b | Example 18 | 22.52 | 22.62 | 0.10 | 0.44 |
| Example 3 Magnesium oxide particles-c | Example 19 | 22.49 | 22.55 | 0.06 | 0.27 |
| Example 4 Magnesium oxide particles-d | Example 20 | 22.55 | 22.61 | 0.06 | 0.27 |
| Example 5 Magnesium oxide particles-e | Example 21 | 22.56 | 22.63 | 0.07 | 0.31 |
| Comparative Example 1 Magnesium oxide particles-f | Comparative Example 11 | 22.50 | 22.83 | 0.33 | 1.47 |
| Comparative Example 2 Magnesium oxide particles-g | Comparative Example 12 | 22.48 | 22.82 | 0.34 | 1.51 |

TABLE 5-continued

| | Unit | Before test g | After test g | Increase g | Increase ratio % |
|---|---|---|---|---|---|
| Comparative Example 3 Magnesium oxide particles-h | Comparative Example 13 | 22.53 | 22.96 | 0.43 | 1.91 |
| Comparative Example 4 Magnesium oxide particles-i | Comparative Example 14 | 22.55 | 23.07 | 0.52 | 2.31 |

Figure 3:
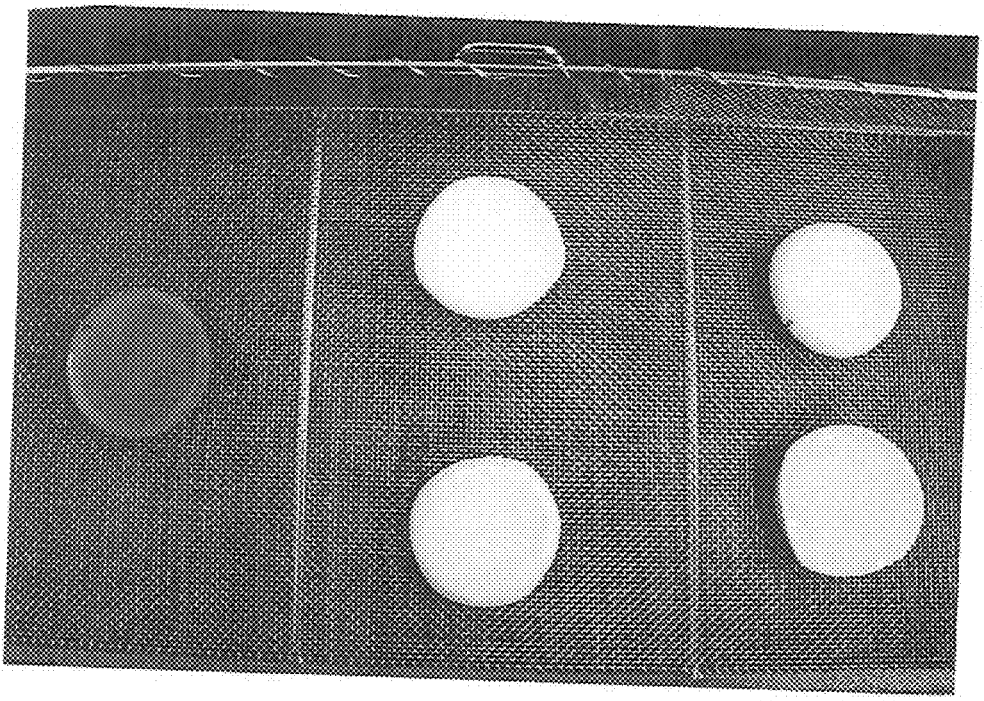
FIG. 3 is a photograph showing the appearance of a sample before doing the Pressure Cooker Test in Examples and Comparative Examples.
Figure 4:
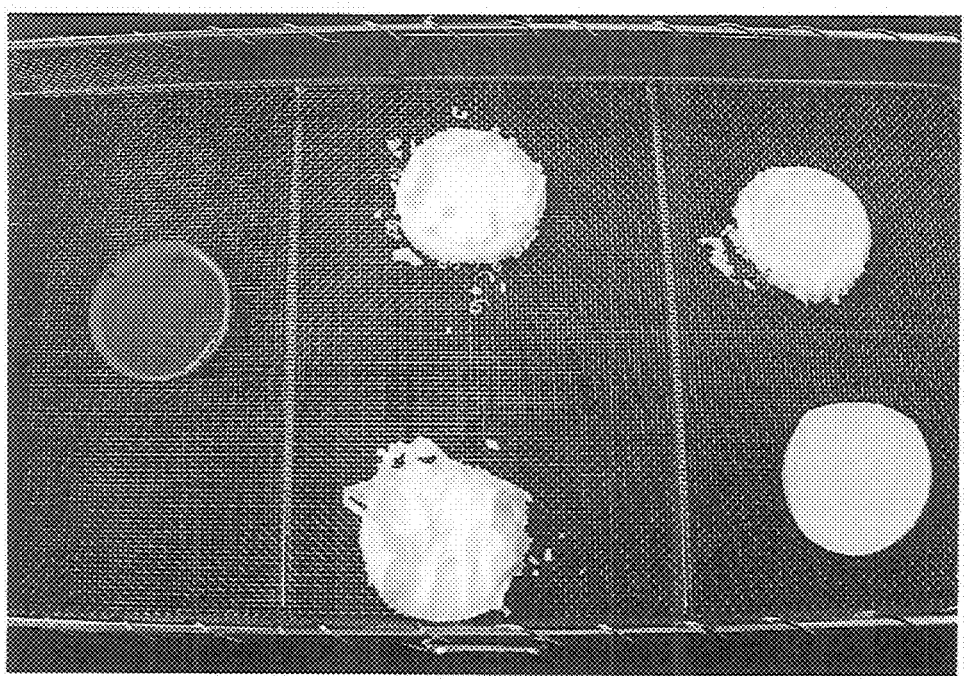
FIG. 4 is a photograph showing the appearance of a sample after doing the Pressure Cooker Test in Examples and Comparative Examples.

Evaluation result photographs of Example 17 and Comparative Examples 10 to 14 are shown in FIGS. 3 and 4. The results shown in Table 5 and FIGS. 3 and 4 clearly show that the resin compositions containing the coated magnesium oxide particles of the present invention are remarkably better in water resistance as compared with the magnesium oxide particles of the Comparative Examples.

Examples 22 to 26

The epoxy resin composition moldings of 40 mm in diameter and 7 mm in thickness produced in Examples 12 to 16 were used. After weight measurement, the respective moldings were immersed in 4 N hydrochloric acid at 70° C. for 20 minutes, then fully washed to remove hydrochloric acid, dried, and then weighed again to determine the decrease in weight. Thus, their acid resistance was evaluated. In this test, a smaller decrease in weight affords a better valuation. The results are shown in Table 6.

Comparative Examples 15 to 19

Using the epoxy resin moldings of 40 mm in diameter and 7 mm in thickness prepared in Comparative Examples 5 and 6 to 9, acid resistance was evaluated in the same way as in Examples 22 to 26. The results are shown in Table 6.

TABLE 6

| | Unit | Before test g | After test g | Decrease g | Decrease ratio % |
|---|---|---|---|---|---|
| Comparative Example 5 Blank | Comparative Example 15 | 7.25 | 7.25 | 0 | 0 |
| Example 1 Magnesium oxide particles-a | Example 22 | 22.53 | 22.51 | 0.02 | 0.09 |
| Example 2 Magnesium oxide particles-b | Example 23 | 22.61 | 22.58 | 0.03 | 0.13 |
| Example 3 Magnesium oxide particles-c | Example 24 | 22.58 | 22.56 | 0.02 | 0.09 |
| Example 4 Magnesium oxide particles-d | Example 25 | 22.54 | 22.52 | 0.02 | 0.09 |
| Example 5 Magnesium oxide particles-e | Example 26 | 22.53 | 22.51 | 0.02 | 0.09 |
| Comparative Example 1 Magnesium oxide particles-f | Comparative Example 16 | 22.49 | 22.27 | 0.22 | 0.98 |
| Comparative Example 2 Magnesium oxide particles-g | Comparative Example 17 | 22.45 | 22.22 | 0.23 | 1.02 |
| Comparative Example 3 Magnesium oxide particles-h | Comparative Example 18 | 22.43 | 22.40 | 0.03 | 0.13 |
| Comparative Example 4 Magnesium oxide particles-i | Comparative Example 19 | 22.48 | 22.45 | 0.03 | 0.13 |

The results of the Examples and the Comparative Examples given in Table 6 clearly show that the coated magnesium oxide particles of the present invention excel in acid resistance. The results shown in Tables 1 to 6 and FIGS. 3 and 4 show that the coated magnesium oxide particles of the present invention exhibit excellent performance in all of heat-releasing property, water resistance, and acid resistance, whereas the magnesium oxide particles of the Comparative Examples exhibited poor performance in any of these properties.

Examples 27 to 32

Also for the magnesium oxide particles of Examples 6 to 11, epoxy resin moldings were produced in the formulations shown in the following Table 7 in the same way as in Examples 12 to 16, followed by the measurement of thermal conductivity. The results are shown in Table 7.

TABLE 7

| | Unit | Comparative Example 5 | Example 12 | Example 27 | Example 28 | Example 29 | Example 30 | Example 31 | Example 32 | Comparative Example 7 |
|---|---|---|---|---|---|---|---|---|---|---|
| Epoxy resin (Bisphenol A type) | g | 7.5 | 7.18 | 7.18 | 7.18 | 7.18 | 7.18 | 7.18 | 7.18 | 7.5 |
| Epoxy resin curing agent (RIKACID MH-700) | g | 6 | 5.75 | 5.75 | 5.75 | 5.75 | 5.75 | 5.75 | 5.75 | 6 |
| N,N-dimethylbenzylamine | g | 0.075 | 0.072 | 0.072 | 0.072 | 0.072 | 0.072 | 0.072 | 0.072 | 0.075 |
| Example 1 Magnesium oxide particles-a | g | | 57.6 | | | | | | | |
| Example 6 Magnesium oxide particles-j | g | | | 57.6 | | | | | | |
| Example 7 Magnesium oxide particles-k | g | | | | 57.6 | | | | | |
| Example 8 Magnesium oxide particles-l | g | | | | | 57.6 | | | | |
| Example 9 Magnesium oxide particles-m | g | | | | | | 57.6 | | | |
| Example 10 Magnesium oxide particles-n | g | | | | | | | 57.6 | | |
| Example 11 Magnesium oxide particles-o | g | | | | | | | | 57.6 | |
| Comparative Example 2 Magnesium oxide particles-g | g | | | | | | | | | 57.0 |
| Inorganic substance volume | v % | 0 | 60.0 | 60.0 | 60.0 | 60.0 | 60.0 | 60.0 | 60.0 | 60.0 |
| Thermal conductivity | W/mk | 0.21 | 3.0 | 3.0 | 3.0 | 3.0 | 3.0 | 3.0 | 3.0 | 2.9 |

Examples 33 to 38

Also for the magnesium oxide particles of Examples 6 to 11, a deterioration test using a pressure cooker testing machine was carried out in the same way as in Examples 17 to 21 using the epoxy resin composition moldings of 40 mm in diameter and 7 mm in thickness produced in Examples 27 to 32. The results are shown in Table 8.

TABLE 8

| | Unit | Before test g | After test g | Increase g | Increase ratio % |
|---|---|---|---|---|---|
| Comparative Example 5 Blank | Comparative Example 10 | 7.51 | 7.62 | 0.11 | 1.46 |
| Example 6 Magnesium oxide particles-j | Example 17 | 22.51 | 22.59 | 0.08 | 0.36 |
| Example 7 Magnesium oxide particles-k | Example 33 | 22.55 | 22.61 | 0.06 | 0.27 |
| Example 8 Magnesium oxide particles-l | Example 34 | 22.49 | 22.56 | 0.07 | 0.31 |
| Example 9 Magnesium oxide particles-m | Example 35 | 22.54 | 22.59 | 0.05 | 0.22 |
| Example 10 Magnesium oxide particles-n | Example 36 | 22.48 | 22.55 | 0.07 | 0.31 |
| Example 11 Magnesium oxide particles-o | Example 37 | 22.50 | 22.54 | 0.04 | 0.18 |
| Example 6 Magnesium oxide particles-j | Example 38 | 22.45 | 22.51 | 0.06 | 0.27 |
| Comparative Example 2 Magnesium oxide particles-g | Comparative Example 12 | 22.48 | 22.82 | 0.34 | 1.51 |

Examples 39 to 44

Also for the magnesium oxide particles of Examples 6 to 11, acid resistance was evaluated in the same way as in Examples 22 to 26 using the epoxy resin composition moldings of 40 mm in diameter and 7 mm in thickness produced in Examples 27 to 32. The results are shown in Table 9.

TABLE 9

| | Unit | Before test g | After test g | Decrease g | Decrease ratio % |
|---|---|---|---|---|---|
| Comparative Example 5 Blank | Comparative Example 15 | 7.25 | 7.25 | 0 | 0 |
| Example 1 Magnesium oxide particles-a | Example 22 | 22.53 | 22.51 | 0.02 | 0.09 |
| Example 6 Magnesium oxide particles-j | Example 39 | 22.42 | 22.41 | 0.01 | 0.04 |
| Example 7 Magnesium oxide particles-k | Example 40 | 22.45 | 22.43 | 0.02 | 0.09 |
| Example 8 Magnesium oxide particles-l | Example 41 | 22.48 | 22.47 | 0.01 | 0.04 |
| Example 9 Magnesium oxide particles-m | Example 42 | 22.54 | 22.52 | 0.02 | 0.09 |
| Example 10 Magnesium oxide particles-n | Example 43 | 22.49 | 22.48 | 0.01 | 0.04 |

TABLE 9-continued

|  | Unit | Before test g | After test g | Decrease g | Decrease ratio % |
|---|---|---|---|---|---|
| Example 11 Magnesium oxide particles-o | Example 44 | 22.55 | 22.52 | 0.03 | 0.13 |
| Comparative Example 2 Magnesium oxide particles-g | Comparative Example 17 | 22.45 | 22.22 | 0.23 | 1.02 |

It is apparent that, as in the magnesium oxide particles of Examples 1 to 5, the magnesium oxide particles of Examples 6 to 11 also exhibit excellent performance in all of heat-releasing property, water resistance, and acid resistance.

INDUSTRIAL APPLICABILITY

The coated magnesium oxide particles of the present invention can be used particularly suitably in fields in which acid resistance and water resistance are required; for example, they can be used suitably as a heat-releasing filler.

The invention claimed is:

1. Coated magnesium oxide particles having a surface coating formed by curing an epoxy resin.

2. The coated magnesium oxide particles according to claim 1, having a (median diameter)/(specific surface area diameter determined from specific surface area) ratio of 2 or less, and a Dmax/(specific surface area diameter determined from specific surface area) of 4 or less.

3. The coated magnesium oxide particles according to claim 2, wherein the surface coating is formed by spray drying a slurry comprising magnesium oxide particles, an epoxy resin, and an epoxy resin curing agent.

4. The coated magnesium oxide particles according to claim 2, wherein the coating amount of the epoxy resin is not less than 0.01 part by weight and not more than 50 parts by weight per 100 parts by weight of magnesium oxide.

5. The coated magnesium oxide particles according to claim 2, obtained by further applying surface treatment on the coating of the epoxy resin.

6. The coated magnesium oxide particles according to claim 1, wherein the surface coating is formed by spray drying a slurry comprising magnesium oxide particles, an epoxy resin, and an epoxy resin curing agent.

7. The coated magnesium oxide particles according to claim 6, wherein the coating amount of the epoxy resin is not less than 0.01 part by weight and not more than 50 parts by weight per 100 parts by weight of magnesium oxide.

8. The coated magnesium oxide particles according to claim 6, obtained by further applying surface treatment on the coating of the epoxy resin.

9. The coated magnesium oxide particles according to claim 6, wherein the slurry further comprises an ammonium salt of a polycarboxylic acid.

10. The coated magnesium oxide particles according to claim 9, wherein the coating amount of the epoxy resin is not less than 0.01 part by weight and not more than 50 parts by weight per 100 parts by weight of magnesium oxide.

11. The coated magnesium oxide particles according to claim 9, obtained by further applying surface treatment on the coating of the epoxy resin.

12. The coated magnesium oxide particles according to claim 6, wherein the slurry comprises a dispersion medium composed of 90% by weight or less of water and a water-miscible solvent as the remainder.

13. The coated magnesium oxide particles according to claim 1, wherein the coating amount of the epoxy resin is not less than 0.01 part by weight and not more than 50 parts by weight per 100 parts by weight of magnesium oxide.

14. The coated magnesium oxide particles according to claim 1, obtained by further applying surface treatment on the coating of the epoxy resin.

15. A method for producing the coated magnesium oxide particles according to claim 1, comprising: step (1) of preparing a slurry comprising magnesium oxide particles, an epoxy resin, and an epoxy resin curing agent, and step (2) of spray drying the slurry obtained by the above step (1).

16. The method for producing coated magnesium oxide particles according to claim 15, wherein the slurry further comprises an ammonium salt of a polycarboxylic acid.

17. The method for producing coated magnesium oxide particles according to claim 15, wherein the slurry comprises a dispersion medium composed of 90% by weight or less of water and a water-miscible solvent as the remainder.

18. The method for producing coated magnesium oxide particles according to claim 15, wherein the magnesium oxide particles have the (median diameter)/(specific surface area diameter determined from specific surface area) ratio of 2 or less, and a Dmax/(specific surface area diameter determined from specific surface area) of 4 or less.

19. A heat-releasing filler composed of the coated magnesium oxide particles according to claim 1.

20. A resin composition comprising the coated magnesium oxide particles according to claim 1.

* * * * *